(No Model.)

J. G. ERNST, C. PETERSEN & H. R. TRAVERS.
RAKING AND CLEANING ATTACHMENT FOR GRATES.

No. 532,194. Patented Jan. 8, 1895.

WITNESSES:
Raymond F. Barnes
F. A. Elmore

INVENTORS
J. G. Ernst
Christian Petersen
H. R. Travers
By P. T. Dodge ATTORNEY.

UNITED STATES PATENT OFFICE.

JOHN G. ERNST, CHRISTIAN PETERSEN, AND HERMAN R. TRAVERS, OF BALTIMORE, MARYLAND, ASSIGNORS TO SAID ERNST, HERMAN R. TRAVERS & CO., AND DIVEN BROTHERS & CO., OF SAME PLACE.

RAKING AND CLEANING ATTACHMENT FOR GRATES.

SPECIFICATION forming part of Letters Patent No. 532,194, dated January 8, 1895.

Application filed August 27, 1894. Serial No. 521,411. (No model.)

*To all whom it may concern:*

Be it known that we, JOHN G. ERNST, CHRISTIAN PETERSEN, and HERMAN R. TRAVERS, of the city of Baltimore and State of Maryland, have invented a new and useful Improvement in Raking and Cleaning Attachments for Grates, of which the following is a specification.

Our invention has reference to a raking and cleaning attachment for furnace and other grates, the object being to provide a device of this character, which will be simple and inexpensive and which may be conveniently operated to effectively rake the ashes, clean the grate bars and keep the spaces between them free.

With these ends in view we have devised an attachment consisting of a transversely extending raking plate, which rests upon the upper surface of the grate bars and which is adapted to be moved back and forth longitudinally of the same by means of an operating rod extending longitudinally beneath the bars and through the front of the furnace and connected at its rear end to the raking plate.

The invention also consists in the details of construction and combination of parts hereinafter described and claimed.

Figure 1:
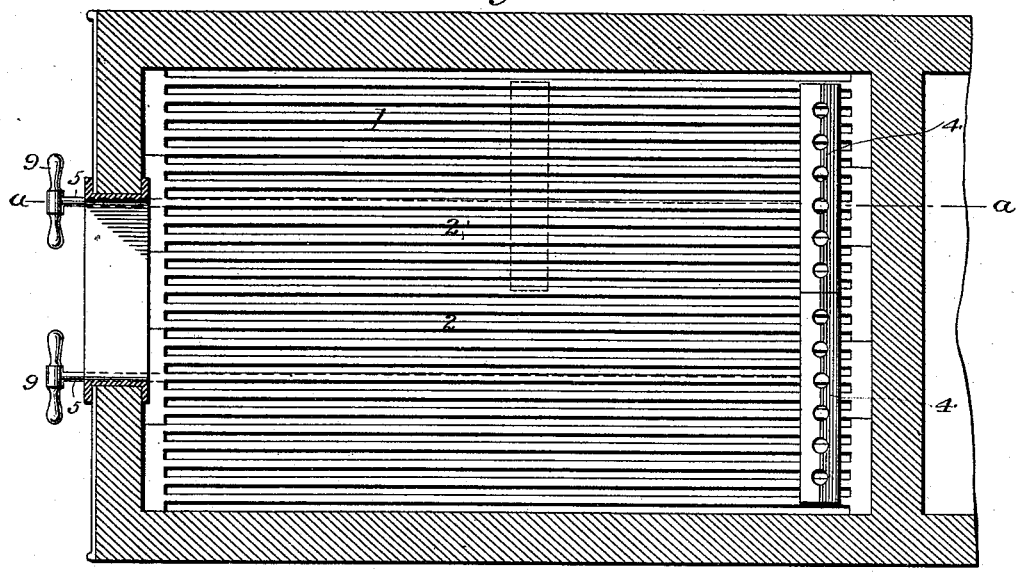
Figure 2:
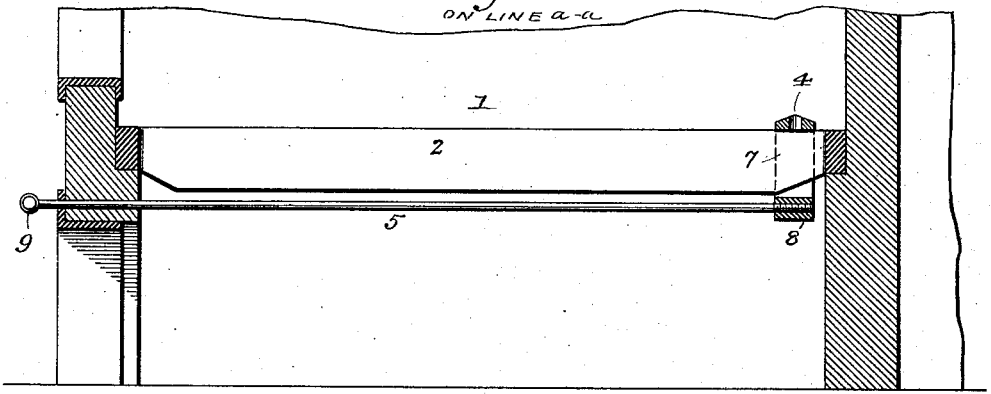
Figure 3:
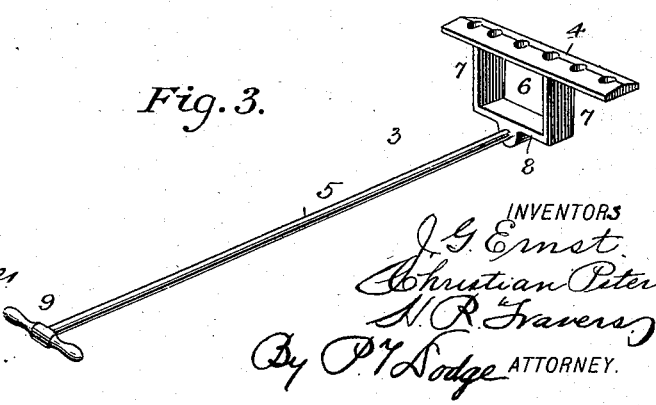

In the accompanying drawings: Figure 1— is a top plan view of a grate with our improved grate raking and cleaning attachment. Fig. 2— is a longitudinal section through the same on the line a—a. Fig. 3— is a perspective view of the attachment removed.

Referring to the drawings, 1— represents a grate consisting of a series of parallel bars 2— arranged side by side with spaces between them in the usual manner.

3— represents our improved raking attachment comprising a raking plate 4— which rests upon the upper edges of the bars and extends transversely of the same as plainly shown in Fig. 1. This plate is designed to be moved back and forth on the bars longitudinally of the same by means of an operating rod 5, extending through the front of the furnace beneath the grate, its end being connected to the lower end of a frame 6, extending upward between the grate bars and connected to the raking plate. The connection between the rear end of the operating rod and the raking plate may be of any appropriate form, but we prefer to employ the frame shown which consists of two vertical arms 7, extending between the grate bars, their upper ends being connected to the under side of the raking plate, while their lower ends are connected by a cross bar 8, to the center of which the rear end of the operating rod is attached. It will be thus seen that our attachment is of extreme simplicity and inexpensive, consisting of but three parts, the transverse raking plate, the operating rod, and the connecting frame extending between the bars.

The operation of the device is effective in keeping the upper surface of the bars clean, in raking the fire and in agitating the bed of fuel. The two vertical arms of the frame extending between the grate bars serve to prevent clogging of the spaces between them. The front end of the operating rod is provided with a handle 9— and the parts are so proportioned and arranged that when out of use the raking plate is pushed back to the position shown in Fig. 1— with the handle on the operating rod resting closely against the front of the furnace.

While in the drawings we have shown two raking plates actuated by two operating rods, it will be understood that but one may be employed which may extend entirely across the grate and it will be further understood that more than two may be used, without departing from the limits of our invention, provided they are constructed and will operate as specified above.

We are aware that stove grates have been provided with movable bottoms adapted to be slid over the grate bars to close or partially close the openings therethrough,—and we are also aware that stove grates have been formed of two members one fixed and the other movable relatively and lying face to face and to such constructions we lay no claim,—but we believe ourselves to be the first to provide a furnace grate with a transverse bar adapted to be moved longitudinally from one end of the grate to the other for the purpose of removing or raking the accumulated layer of ashes. By the employment of this raking bar the ashes may be removed without disturbing the overlying body of fuel. In the constructions referred to where the grate is composed of two members one movable relatively with respect to the other, the entire bed of fuel is supported by the movable bars and its movement is a matter of considerable difficulty so that it is not possible to rake the ashes thoroughly as in our case.

Having thus described our invention, what we claim is—

1. In combination with an oblong furnace grate, a transverse raking bar or plate lying upon the grate and adapted to travel thereover from end to end, an operating rod underlying the grate bar and connected to the raking bar substantially as shown and described.

2. In combination with a grate comprising a series of bars arranged side by side with spaces between them, an overlying raking plate extending transversely across the bars, an operating rod extending longitudinally of the bars beneath the same, two vertical arms extending between the bars and connected at their upper ends to the raking plate, and a cross bar connecting the lower ends of said arms and attached to the rear end of the operating rod.

In testimony whereof we hereunto set our hands, this 13th day of August, 1894, in the presence of two attesting witnesses.

JOHN G. ERNST.
CHRISTIAN PETERSEN.
HERMAN R. TRAVERS.

Witnesses:
THOS. C. BAILEY,
S. LAUER, Jr.